(12) United States Patent
Figueroa Martinez

(10) Patent No.: US 10,119,033 B2
(45) Date of Patent: *Nov. 6, 2018

(54) INSULATING, CORROSION-INHIBITING, SELF-EXTINGUISHING, IMPERMEABLE, EPOXY AND ECOLOGICAL COATING

(71) Applicant: G-COVER DE MÉXICO, S.A. DE C.V., Sonora (MX)

(72) Inventor: Moises Figueroa Martinez, Querétaro (MX)

(73) Assignee: G-COVER DE MÉXICO, S.A. DE C.V., Sonora (MX)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,385

(22) PCT Filed: Dec. 16, 2014

(86) PCT No.: PCT/MX2014/000209
§ 371 (c)(1),
(2) Date: Jun. 16, 2017

(87) PCT Pub. No.: WO2016/099235
PCT Pub. Date: Jun. 23, 2016

(65) Prior Publication Data
US 2017/0327696 A1    Nov. 16, 2017

(51) Int. Cl.
| | | |
|---|---|---|
| C09D 5/18 | (2006.01) |
| C09D 5/08 | (2006.01) |
| C09D 135/02 | (2006.01) |
| C09D 7/61 | (2018.01) |
| C08K 3/36 | (2006.01) |
| C09D 133/08 | (2006.01) |
| C08L 33/08 | (2006.01) |
| C09D 7/43 | (2018.01) |
| C08K 3/22 | (2006.01) |

(52) U.S. Cl.
CPC ............... *C09D 5/08* (2013.01); *C08K 3/36* (2013.01); *C08L 33/08* (2013.01); *C09D 5/18* (2013.01); *C09D 7/43* (2018.01); *C09D 7/61* (2018.01); *C09D 133/08* (2013.01); *C09D 135/02* (2013.01); C08K 2003/2227 (2013.01); C08K 2003/2265 (2013.01)

(58) Field of Classification Search
CPC ... C09D 1/00; C09D 5/08; C09D 5/18; C09D 7/1216; C09D 135/02; C09D 7/43; C09D 7/61; C09D 133/08; C08K 3/36; C08K 2003/2227; C08K 2003/2265; C08L 33/08

See application file for complete search history.

(56) References Cited

U.S. PATENT DOCUMENTS

| | | | |
|---|---|---|---|
| 4,826,907 A | 5/1989 | Murao et al. |
| 5,612,130 A | 3/1997 | Smirnov et al. |
| 2005/0277543 A1 | 12/2005 | Takahashi et al. |
| 2008/0233295 A1 | 9/2008 | Ye et al. |
| 2017/0327699 A1* | 11/2017 | Figueroa Martinez .. C09D 5/18 |

FOREIGN PATENT DOCUMENTS

| | | | | |
|---|---|---|---|---|
| CN | 103450773 A | | 12/2013 | |
| CN | 103819988 A | | 5/2014 | |
| CN | 104293042 A | * | 1/2015 | ........... C09D 133/00 |
| CN | 104327558 A | * | 2/2015 | ................ C09D 4/02 |
| CN | 104496373 A | * | 4/2015 | ............ C04B 28/10 |
| EP | 0 583 051 A1 | | 2/1994 | |
| JP | 2006169380 A | | 6/2006 | |

OTHER PUBLICATIONS

Celite Material Safety Data Sheet No. 2400, Rev. No. 8, Celite Corporation, Feb. 15, 2004.*
International Search Report, dated Sep. 2, 2015 for corresponding International Application No. PCT/MX2014/000209 with English translation.
Written Opinion of the ISA, dated Sep. 2, 2015 for corresponding International Application No. PCT/MX2014/000209 with English translation.

* cited by examiner

*Primary Examiner* — Anthony J Green
(74) *Attorney, Agent, or Firm* — Intellectual Property Law Group LLP

(57) ABSTRACT

The invention relates to a water-based coating composition with the following components: 21-51% water, 4-13% diatomite C110 (flux calcined diatomaceous earth, commercially available under CELITE), 2-6% calcined alumina, 0.3-2% hexylene glycol, 16-47% elastomeric acrylic resin, 0.7-3% acrylic thickener, and 0.7-3% ammonium hydroxide. Preferably, the composition also includes optionally the following components in order to provide the insulating, corrosion-inhibiting, self-extinguishing, impermeable, epoxy and ecological properties: 2-6% titanium dioxide, 4-13% precipitated calcium carbonate, 2-6% dibutyl phthalate, 0.3-2% TEXANOL (2,2,4-trimethyl-1,3-pentanediol monoisobutyrate), 0.3-2% fungicide, and 0.3-2% anti-foaming agent. By means of these ranges, a variety of applications can be covered for which the composition of an insulating, corrosion-inhibiting, self-extinguishing, impermeable, epoxy and ecological coating was developed.

7 Claims, No Drawings

INSULATING, CORROSION-INHIBITING, SELF-EXTINGUISHING, IMPERMEABLE, EPOXY AND ECOLOGICAL COATING

FIELD OF THE INVENTION

The present invention refers to water-based coating compositions which are insulating, corrosion-inhibiting, self-extinguishing, impermeable, epoxy and ecological and have several industrial uses.

BACKGROUND OF THE INVENTION

There are many coating compositions found in the prior art which provide many properties like, for example, flame resistance, corrosion resistance, heat resistance, water resistance, or acid or alkaline resistance.

For example, European Patent Application No. EP 0 583 051 A1 teaches a water-based coating composition with flame resistance, corrosion resistance, heat resistance, and acid or alkaline resistance properties but with very limited applications and thermal conductivity, thermal expansion, weatherproof resistance and eco-friendly properties, not to mention that it is high cost, is made up of expensive raw materials, requires complex mixing technology and generates mineral and metallurgical waste due to its particular and limited composition and manufacturing method comprising a heat resistant metal oxide and a heat resistant silica or aluminum silicate in an alkaline metal silicate aqueous solution.

Likewise, US Patent Application No. US 2008/0233295 A1 teaches an antioxidant coating composition with very limited applications and thermal conductivity, thermal expansion, weatherproof resistance and eco-friendly properties, not to mention that it is high cost, is made up of extensive raw materials, requires complex mixing technology and generates mineral and metallurgical waste due to its particular and limited composition and manufacturing method comprising a prepared paste based upon a mixture of manganese mineral, metallurgical solid waste, aluminum powder, an organic thickener and an inorganic binder.

Finally, U.S. Pat. No. 5,612,130 teaches a multi-purpose coating with resistance to fire, corrosion, acids, alkalis, electrolytes, microorganisms, or strong thermal fluids but with very limited applications and thermal conductivity, thermal expansion, weatherproof resistance and eco-friendly properties, not to mention that it is high cost, is made up of expensive raw materials, requires complex mixing technology and generates mineral and metallurgical waste due to its particular and limited composition and manufacturing method comprising a continuous lower layer which is fire resistant and is oxidized graphite based and a hydrophobic upper layer comprising an inorganic hydrophobic powder, an adhesive, a silicone liquid and a volatile organic solvent.

Notwithstanding, none of the coating compositions found in the prior art have eco-friendly properties and a very high performance when it comes to showing flame resistance, corrosion resistance, heat resistance, water resistance, and acid or alkaline resistance not to mention that it is low cost, requires very simplified manufacturing technology, and cheap raw materials as the one of the composition sought to be protected in the present application.

SUMMARY OF THE INVENTION

The present invention consists of an insulating, corrosion-inhibiting, self-extinguishing, impermeable, epoxy and ecological coating composition.

The present invention comprises of a water-based coating composition with the following components: 21-51% water, 4-13% diatomite C110 (flux calcined diatomaceous earth, commercially available under CELITE), 2-6% calcined alumina, 0.3-2% hexylene glycol, 16-47% elastomeric acrylic resin, 0.7-3% acrylic thickener, and 0.7-3% ammonium hydroxide. Preferably, the composition also includes optionally the following components in order to provide the insulating, corrosion-inhibiting, self-extinguishing, impermeable, epoxy and ecological properties: 2-6% titanium dioxide, 4-13% precipitated calcium carbonate, 2-6% dibutyl phthalate, 0.3-2% TEXANOL (2,2,4-trimethyl-1,3-pentanediol monoisobutyrate), 0.3-2% fungicide, and 0.3-2% anti-foaming agent.

DETAILED DESCRIPTION OF THE INVENTION

The present invention comprises of a water-based coating composition, with the following components: 21-51% water, 4-13% diatomite C110 (flux calcined diatomaceous earth, commercially available under CELITE), 2-6% calcined alumina, 0.3-2% hexylene glycol, 16-47% elastomeric acrylic resin, 0.7-3% acrylic thickener, and 0.7-3% ammonium hydroxide. Preferably, the composition also includes optionally the following components in order to provide the insulating, corrosion-inhibiting, self-extinguishing, impermeable, epoxy and ecological properties: 2-6% titanium dioxide, 4-13% precipitated calcium carbonate, 2-6% dibutyl phthalate, 0.3-2% TEXANOL (2,2,4-trimethyl-1,3-pentanediol monoisobutyrate), 0.3-2% fungicide, and 0.3-2% anti-foaming agent. By means of these ranges, a variety of applications can be covered for which the composition of an insulating, corrosion-inhibiting, self-extinguishing, impermeable, epoxy and ecological coating was developed.

Among them, there is the low rate of thermal conductivity to room temperatures. With this quality, it can be applied not only when it is in contact with sunlight, but also under circumstances in which it is close to the heat source. These qualities can be obtained in great measure due to the composition's inclusion of ceramic minerals.

Through the previously-mentioned properties, the applications for the coating are countless, including: insulating coating over high temperature operating surfaces preventing thermal transfer due to its ceramic composition. Due to its low rate of thermal conductivity of K equal to 0.0059 btu/hr/ft$^2$, the coating is considered to be an energy consumption saver as it does not allow the transfer of the temperature to an opposite face of the surface in which the coating was applied, in this way, the cooling units particularly working in a constant manner.

As a corrosion-inhibitor, the coating has been tested under the ASTM G53 industry standard, in which no thickness variation is obtained as the coating was designed to prevent the corrosion triangle preventing thereby that the oxygenation process of the oxide reaches the substrate surface to which it was applied. The process in which the product takes place is by means of encapsulation preventing thereby that the coated element be in contact with the elements.

Due to its impermeable and thermal insulating properties, the coating has been tested by the ASTM E96 industry standard in which the water transfer is measured in one coating face to the other and a result of 0.00005% is obtained and, thus, it is excellent for impermeabilization applications as it, with the principle of being a thermal insulator, prevents the substrate in which it is applied from being heated and from developing dilations or contractions, leading to the non-development of fissures. The impermeability of the product is very high due to its styrene resin composition and its low solid percentage in the formulation.

The constant product elongation is 500% which, in case it is as an impermeable coating, allows structural movement in the surface in which it was applied without losing of its properties.

The coating has the property of being self-extinguishing in great measure due to its water-based composition and its mineral ceramic composition which does not allow flame propagation through it. Thus, no fumes are generated in the moment of contact with the same.

The coating composition also have UV refraction properties which results in a remarkable temperature differential and reduces the damage to the surfaces of, for example, materials and apparatuses.

The coating composition is also biodegradable which thus leads to causing no damage to the environment in the case of spills due to being emulsified in water and containing no asbestos and being eco-friendly to wildlife.

With its low density and molecular weight, the coating also leads to low manufacturing costs due to the use of cheap raw materials and simplified mixing technology.

Example 1

The several formulations in which the coating is subject to generates a wide range of applications. The formulation is based on the following values: 50.07% water, 4.38% diatomite C110 (flux calcined diatomaceous earth, commercially available under CELITE), 2.11% titanium dioxide, 2.11% calcined alumina, 4.38% precipitated calcium carbonate 0.38% hexylene glycol, 2.11% dibutyl phthalate, 0.38% TEXANOL (2,2,4-trimethyl-1,3-pentanediol monoisobutyrate), 16.85% elastomeric acrylic resin, 2.07% acrylic thickener, 0.38% fungicide, 0.74% ammonium hydroxide and 0.38% anti-foaming agent. Through these ranges, the coating is used as a primary corrosion inhibitor or anchor base, as a component in the generation of permeable concrete and resistant to acid or alkaline attacks for applications of impermeable material. Due to its drying, the coating generates an elastomeric film which prevents humidity from entering through it.

The former has been tested and proven by official certification IIM/ST/170/2014 issued by UNAM's Material Research Institute in which it is determined that the applied material is permeable.

Example 2

When redesigning the water-based coating composition, with the following components: 21.07% water, 12.39% diatomite C110 (flux calcined diatomaceous earth, commercially available under CELITE), 5.91% titanium dioxide, 5.91% calcined alumina, 12.39% precipitated calcium carbonate, 1.06% hexylene glycol, 5.91% dibutyl phthalate, 1.06% TEXANOL (2,2,4-trimethyl-1,3-pentanediol monoisobutyrate), 47.25% elastomeric acrylic resin, 0.74% acrylic thickener, 1.06% fungicide, 2.07% ammonium hydroxide and 1.06% anti-foaming agent. With these percentages, a coating with the hardness and resistance of an industrial floor epoxy is obtained. This quality was tested by means of the ASTM D-2240 industry standard with respect to the hardness, obtaining an approved "Shore D" result range. The main difference is that it is water-based, withstanding the substrate contractions in which it is applied and which, due to quality, the mechanical resistance property was tested through the ASTM D-2294 industry standard, obtaining a result of 2.785 kg/m, thus being approved and certified through this industry standard.

Example 3

With the following approximate proportions, a result with higher stability rates and uniform behavior is achieved by the coating composition comprising: 37.62% water, 7.83% diatomite C110 (flux calcined diatomaceous earth, commercially available under CELITE), 3.76% titanium dioxide, 3.76% calcined alumina, 7.83% precipitated calcium carbonate, 0.68% hexylene glycol, 3.76% dibutyl phthalate, 0.68% TEXANOL (2,2,4-trimethyl-1,3-pentanediol monoisobutyrate), 30.10% elastomeric acrylic resin, 1.32% acrylic thickener, 0.68% fungicide, 0.68% ammonium hydroxide and 0.68% anti-foaming agent. Through these ranges, a coating with several applications is obtained among others, application of corrosion inhibitor for metallic structures without the need of placing a primary anchor or deep cleaning, application tested through the ASTM E937 industry standard, obtaining the certified and approved result of less than 0.00 G/mm.

The coating has the function of being a thermal insulator, which reduces the temperature in the face of the surface opposite to the one being applied. The coating can be applied in the majority of substrates surfaces such as metallic, concrete, wood, drywall and its derivates, plastic, glass, etc. . . . . .

Example 4

The coating in any of the embodiments has the quality of being an impermeable material which can be applied in any type of Surface. The elongation greater than 500% which the coating has is just yet one of its many outstanding qualities which, because of that, can absorb dilations and contractions of the element in which it is applied and, thus, optimized all of the characteristics of the same.

Example 5

With the following approximate proportions, a substantially solid impermeable product is obtained comprising: 37.62% water, 7.83% diatomite C110 (flux calcined diatomaceous earth, commercially available under CELITE), 7.83% precipitated calcium carbonate, 3.76% titanium dioxide, 3.76% calcined alumina, 0.68% hexylene glycol, 3.76% dibutyl phthalate, 0.68 TEXANOL (2,2,4-trimethyl-1,3-pentanediol monoisobutyrate), 30.10% elastomeric acrylic resin, 1.32% acrylic thickener, 0.68% fungicide, 0.68% ammonium hydroxide, 0.68% anti-foaming agent, and 9.65% ceramic fiber.

Among the many applications of the composition used as a coating of the present invention, one can find it being applied to any type of surface, as previously mentioned, including but not limited to metallic, concrete, wood, drywall and its derivatives, plastic, glass, etc . . . , used in a number of industries including mining, aviation, oil and gas, construction, marine, medical, among others.

What is claimed is:

1. A composition used as an insulating, corrosion-inhibiting, self-extinguishing, impermeable, epoxy and ecological coating, comprising:
   21-51% water,
   4-13% flux calcined diatomaceous earth,
   2-6% calcined alumina, 0.3-2% hexylene glycol,
16-47% elastomeric acrylic resin,
0.7-3% acrylic thickener, and
0.7-3% ammonium hydroxide.

2. The composition in accordance with claim 1, further comprising 2-6% titanium dioxide.

3. The composition in accordance with claim 1, further comprising 4-13% precipitated calcium carbonate.

4. The composition in accordance with claim 1, further comprising 2-6% dibutyl phthalate.

5. The composition in accordance with claim 1, further comprising 0.3-2% 2,2,4-trimethyl-1,3-pentanediol monoisobutyrate.

6. The composition in accordance with claim 1, further comprising 0.3-2% fungicide.

7. The composition in accordance with claim 1, further comprising 0.3-2% anti-foaming agent.

* * * * *